GRADIOMETER READOUT CIRCUIT EMPLOYING PHASE LOCKED MULTIPLIER CIRCUIT LOOPS

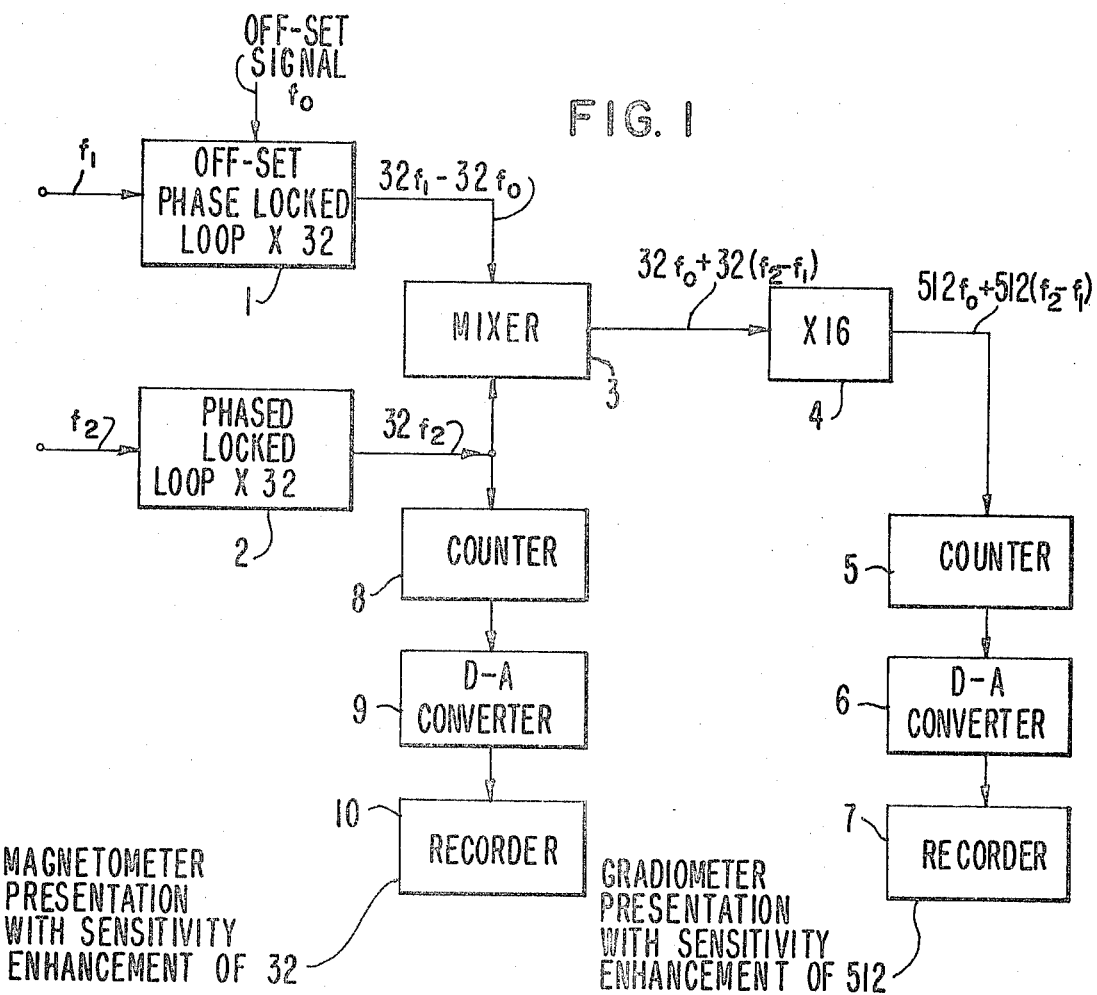
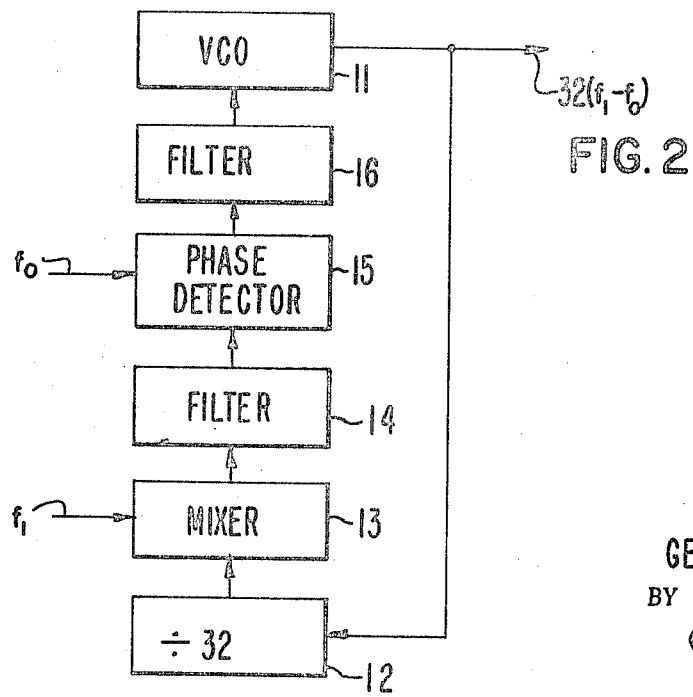

George R. Huggett, Sunnyvale, Calif., assignor to Varian Associates, Palo Alto, Calif., a corporation of California
Filed Nov. 8, 1967, Ser. No. 681,543
Int. Cl. G01r 23/14, 33/08
U.S. Cl. 324—79                                           6 Claims

ABSTRACT OF THE DISCLOSURE

In a gradiometer readout circuit exhibiting increased signal-to-noise ratio, extended dynamic range and simplified operation providing for both analog and digital output information, there is disclosed two phase-locked loop X32 multipliers adapted to receive magnetometer signals $f_1$ and $f_2$ from two spaced apart magnetometers. One of the multipliers is of a novel off-set type for preventing the generation of a zero beat signal in the event the magnetometers' signals approach equality. The multiplied input signals are mixed and then further multiplied by an X16 multiplier. Provisions are included at the output of the X16 multiplier and one of the X32 multipliers for the conversion of gradiometer and magnetometer information of high sensitivity for providing the information for recording in either or both digital and analog form.

BACKGROUND

The present invention relates in general to readout circuits for gradiometers and in particular to simplified apparatus with digital and analog output of high sensitivity and increased signal-to-noise ratio for improved gradiometric data handling in airborne geophyical exploration and other related fields.

A gradiometer essentially consists of two or more spaced apart magnetometers coupled to apparatus the output of which provides a presentation or measure of the magnetic field gradient between two points in a magnetic field.

The latter apparatus, more commonly called a readout circuit, employs a series of circuits which altogether result in a precise measurement of the field gradient. The degree of precision that can be expected is a function of the signal-to-noise ratio and sensitivity of the magnetometer signal processing equipment.

In order to avoid the circuit design problems encountered when two magnetometers are measuring magnetic fields of equal intensity, the practice has been to "off-set" the frequency of the magnetometer inputs by a certain predetermined amount.

In the past, the "off-set" was established by "beating" a signal frequency $f_0$ from a crystal oscillator bank against each of the incoming magnetometer signals $f_1$ and $f_2$, respectively, obtaining thereby signals $f_0-f_1$ and $f_0-f_2$. One of these sideband signals, for example, $f_0-f_1$, was then mixed with a second crystal oscillator signal, filtered and then mixed with the second sideband, $f_0-f_2$, to produce a difference signal $f_2-f_2$ which was then discriminated to obtain a DC voltage as a function of the difference frequency for providing an input to a graphic recorder or like device.

While readout circuits of the described type exhibit sensitivity comparable to that exhibited by the instant invention, the crystal banks display a limited dynamic range and are bulky and difficult to operate due to the requirement that their operating temperatures be maintained constant by means of ovens or the like.

SUMMARY OF THE INVENTION

The gradiometer readout circuit of the present invention is described for operation with two alkali vapor magnetometers (not shown) each of which produces an output signal of frequency $f_1$ and $f_2$, respectively.

Each magnetometer signal is multiplied by a factor, for example 32, by a phase-locked loop multiplier. The multiplied signals are then mixed and a difference frequency developed. The difference frequency is then multiplied by a factor, such as 16, which results in an overall gradiometric system sensitivity of 512. In the preferred embodiment, the output of the X16 multiplier is then fed to a graphic recorder via a digital counter and digital to analog converter.

Alternatively, the output of the counter, which is in digital form, may be used as the input of a digital computer or other data processor to provide rapid and accurate development of magnetic field profiles.

In order to avoid a zero beat in the event that two magnetometers are measuring a field of equal intensity, $f_1 \approx f_2$, one of the X32 phase-locked loops is off-set by a signal of frequency $f_0$. In contrast to prior known off-set circuits as described, the off-set phase-locked loop of the present invention does not use crystal banks thereby eliminating many difficult system controls and being in the nature of a tracking narrow-band tuned filter, provides an increased signal-to-noise ratio, an extended dynamic range and permits the use of less complex mixing and final multiplication stages.

Accordingly, a primary object of the present invention is a simplified gradiometer readout circuit exhibiting high sensitivity, increased signal-to-noise ratio and extended dynamic range.

Another object of the invention is a gradiometer readout circuit as described which uses simplified and less complex circuitry with provision for either analog or digital outputs.

Another important feature of the present invention is an off-set phase-locked loop X32 multiplier which permits the use of less complex mixing and multiplication circuits.

Another feature of the invention as described is the provision for simultaneous readout of gradiometric and magnetometer information.

Other objects, features and advantages of the invention will become apparent in the following detailed description when considered in connection with the accompanying drawing in which:

FIG. 1 is a block diagram of the present invention; and
FIG. 2 is a block diagram of the off-set phase-locked loop X32 multiplier shown in FIG. 1.

DETAILED DESCRIPTION

Referring to FIG. 1, there is shown a block diagram of the present invention in which a signal of frequency $f_1$ from a first alkali vapor magnetometer (not shown) and a signal of frequency $f_2$ from a second alkali vapor magnetometer (not shown) spaced apart from said first magnetometer are each respectively coupled to an off-set phase-locked loop X32 multiplier 1 and phase-locked loop X32 multiplier 2. Phase-locked loop X32 multiplier 2 may be of any conventional design, such as is disclosed by Serson in U.S. Pat. 3,070,745.

The outputs of X32 multipliers 1, 2, $32f_1-32f_0$ and $32f_2$, respectively, are then coupled to a mixer 3, the output of which is the difference of the inputs, i.e., $32f_0+32(f_2-f_1)$. The output of mixer 3 is applied to the input of a X16 multiplier 4 resulting in a gradiometer sensitivity of 512, i.e., $512f_0+512(f_2-f_1)$. The output of X16 multiplier 4 is then coupled to a counter 5 which produces a digital output for application to a digital-to-analog converter 6 which is in turn coupled to a recorder 7 for providing a visual continuous gradiometric profile of the magnetic field in which the magnetometers are located.

Alternatively, the output of counter 5 may be coupled to digital data processing equipment (not shown) for processing in any well known manner.

A second counter 8 is coupled between the output of X32 multiplier 2 and another digital-to-analog converter 9 providing a visual continuous profile of magnetic field intensity on a recorder 10. Alternatively, the outputs of converters 6 and 9 may be coupled to a two channel recorder (not shown) for providing a simultaneous presentation of both magnetometer and gradiometer information on the same chart.

Referring to FIG. 2 there is shown the off-set phase-locked loop X32 multiplier shown in FIG. 1.

A voltage controlled oscillator 11 is adjusted to operate at a multiple, i.e., 32 of the difference between magnetometer output signal $f_1$ and the low frequency off-set signal $f_0$ for providing one of the input signals to mixer 3 in the form $32(f_1-f_0)$.

As shown, the output of oscillator 11 is divided by 32 by a divider 12 the output of which is then mixed with $F_1$ in a mixer 13. The output of mixer 13 passes through a filter 14 and is then matched to the off-set signal $f_0$ in phase detector 15. The error signal obtained at the output of phase detector 15 is then passed through a filter 16 and coupled to the control input of voltage controlled oscillator 11 for adjusting the frequency of oscillator to precisely $32(f_1-f_0)$.

Typically, the off-set signal freqeuncy $f_0$ is chosen to fall within the range $f_0 > 10(f_1-f_2)$ and $f_0 < f_{1/10}$ or $f_{2/10}$ whichever is lower.

In the first instance, $f_0$ is chosen to be 10 times the highest expected difference frequency in order to minimize the design constraints on the following circuits. For example, X16 multiplier 4, which typically may be a tuned circuit multiplier, may be designed with a lower Q and still provide adequate rejection of higher and lower harmonics thereby increasing the signal-to-noise ratio of the system.

In the second instance, $f_0$ is chosen to be less than 10 percent of either $f_1$ or $f_2$ whichever is expected to be lower to insure adequate separation of the input signal to the mixer, i.e., $32f_1-32f_0$ and $32f_2$, thereby minimizing design constraints on mixer 3 which would otherwise require provision for a null or extremely low frequency output in the event $f_1$ and $f_2$ approached equality.

As regards the multiplication factors 32 and 16, 32 is chosen as it results in conveniently usable frequencies, whereas, 16 is chosen to provide the desired sensitivity. Alternatively, any multiplier could be used without departing from the scope of the invention, though other selections would increase the complexity of the off-set phase-locked loop multiplier 1 and following circuits.

As described, the invention is intended for use with alkali vapor magnetometers in which the signals $f_1$ and $f_2$ are continuous functions of magnetic field intensity; however, it should be understood that proton magnetometers may be used with satisfaction if additional circuits are provided to effect rapid lock-up of the phase-locked multipliers to the precession signals.

Other modifications to the described apparatus and alternative embodiments within the scope of the invention will obviously be apparent to those skilled in the art. Accordingly, the description and drawings herein are to be considered merely as illustrative and shall not be construed as limiting the invention hereinafter defined.

What is claimed is:

1. In a gradiometer readout circuit, magnetometer means for producing first and second input signals $f_1$ and $f_2$, respectively, each having a frequency which is a function of the magnetic field intensity in spaced regions of the magnetic field, means for generating a reference frequency signal $f_0$ which is less than 10 percent of the frequency of $f_1$ or $f_2$ whichever is lower, first multiplier means for combining the frequency of $f_1$ of said first magnetometer input signal to the gradiometer with the frequency $f_0$ of said offset reference frequency signal and for producing a first output signal having a frequency equal to a certain multiple $n$ of the difference frequency $(f_1-f_0)$ between the frequencies of the first magnetometer signal $f_1$ and the offset reference frequency $f_0$, second multiplier means for multiplying the frequency $f_2$ of the second magnetometer input signal to the gradiometer by the same certain multiple $n$ to obtain a second multiplied frequency $nf_2$ and, means for mixing the first and second multiplied output frequencies to obtain a third output signal having a frequency equal to the multiplied offset frequency $nf_0$ plus the multiplied frequency difference between the frequencies of the first and second magnetometer signals $n(f_2-f_1)$, and third multiplying means for multiplying the third output frequency by a certain multiple $m$ to obtain a fourth output signal having a frequency to be counted and which is determinative of the magnetic field gradient.

2. A gradiometer readout apparatus according to claim 1 including
    counting means coupled to the output of said third multiplying means;
    converting means coupled to the output of said counting means for providing a recordable signal; and
    means coupled to said converting means for recording said recordable signal.

3. A gradiometer readout apparatus according to claim 2 including
    second counting means coupled to the output of second multiplying means;
    second converting means coupled to the output of said second counting means for providing a recordable signal; and
    means coupled to said second converting means for recording said recordable signal.

4. A gradiometer readout apparatus according to claim 1 wherein said offset signal is of a frequency greater than $10(f_1-f_2)$ and less than $f_{1/10}$ or $f_{2/10}$ whichever is lower.

5. A gradiometer readout apparatus according to claim 1 wherein said first multiplying means comprises:
    a voltage controlled oscillator adjustable to operate at a frequency $n(f_1-f_0)$ which is the certain multiple $m$ of the difference frequency between the frequency of said first magnetometer signal and said offset reference frequency;
    a divider coupled to the output of said oscillator;
    a mixer adapted to receive said first magnetometer input signal $f_1$ and coupled to the output of said divider for mixing said divider output signal $(f_1-f_0)$ and said first magnetometer signal $f_1$ to derive an output signal at the offset reference frequency $f_0$;
    a phase detector adapted to receive said offset reference frequency signal $f_0$ and coupled to the reference offset frequency $f_0$ output of said mixer for developing an error signal, and means for connecting said error signal to said oscillator for controlling the frequency output of said oscillator.

6. An off-set phase-locked loop multiplier for use in gradiometer readout circuits and adapted to receive first and second input signals comprising:
    a voltage controlled oscillator adjustable to operate at a frequency which is a multiple of the difference frequency between said first $f_1$ and said second $f_0$ input signals;
    a divider coupled to the output of said oscillator;
    a mixer adapted to receive said first iput signal $f_1$ and coupled to the output of said divider for mixing the frequency of said divider output signal and the frequency of said first signal to produce a difference frequency signal of a frequency substantially equal to the frequency $f_0$ of the second input signal.

a phase detector adapted to receive the second signal $f_0$ and coupled to the output of said mixer for developing an error signal, and means for connecting said error signal to said oscillator for controlling the frequency output of said oscillator.

References Cited

UNITED STATES PATENTS

| 2,433,103 | 7/1947 | Koechlin | 324—79X |
| 2,946,963 | 7/1960 | Lee | 328—16X |
| 3,040,222 | 6/1962 | Kunz | 324—83(FCE)UX |
| 3,227,952 | 1/1966 | Proebster et al. | 324—79 |
| 3,297,953 | 1/1967 | Colton | 331—25X |
| 3,334,305 | 8/1967 | Chu-Sun Yen | 324—83(FCE)X |
| 3,274,488 | 9/1966 | Washkuraic et al. | 324—5 |

ALFRED E. SMITH, Primary Examiner

U.S. Cl. X.R.

324—0.5